United States Patent [19]

McMaster

[11] 4,356,018

[45] Oct. 26, 1982

[54] METHOD AND APPARATUS FOR DEEP BENDING GLASS SHEETS

[76] Inventor: Harold A. McMaster, 707 Riverside Dr., Woodville, Ohio 43469

[21] Appl. No.: 299,412

[22] Filed: Sep. 4, 1981

[51] Int. Cl.³ ............................................. C03B 23/02
[52] U.S. Cl. ...................................... 65/104; 65/106; 65/107; 65/273; 65/268
[58] Field of Search ................. 65/104, 273, 268, 106, 65/107

[56] References Cited

U.S. PATENT DOCUMENTS

| 4,202,681 | 5/1980 | McMaster et al. | 65/268 X |
| 4,204,854 | 5/1980 | McMaster et al. | 65/273 X |
| 4,229,199 | 3/1980 | Seymour | 65/106 |
| 4,282,026 | 8/1981 | McMaster et al. | 65/273 |

Primary Examiner—Arthur D. Kellogg
Attorney, Agent, or Firm—Reising, Ethington, Barnard, Perry & Brooks

[57] ABSTRACT

An improved method and apparatus (12) for deep bending glass sheets disclosed provides minimal sliding of the glass sheet with respect to a curved bending mold (44) utilized, insures accurate positioning of the glass sheet on the mold for bending to the desired shape, and permits relatively abrupt end bends to be performed. A heated glass sheet (G) is initially supported against a downwardly facing surface (26) of a holder (24) above the curved bending mold (44) which has an upwardly concave shape. An upward gas flow (49) from a gas supply unit (48) at a central portion (50) of the glass sheet (G) is supplied and continued as opposite extremities (52) of the glass sheet are released and dropped downwardly onto the mold. Thereafter, termination of the upward gas flow (49) from the gas supply unit (48) releases the central portion (50) of the glass sheet (G) for bending on the mold (44). After the bending, a mold is moved to a quench unit (22) for tempering of the bent glass sheet. This method and apparatus have particular utility with: a roller conveyor (18) on which heating is performed within a heating chamber (16); a holder (24) located within the heating chamber and having a downwardly facing surface (26) of a planar shape at which a vacuum is drawn to initially support the entire glass sheet (G) and thereafter assist the upward gas flow in supporting the central portion (50) thereof; a curved bending mold (44) of an open center ring type; and gas jet pumps (64) for supplying the upward gas flow.

14 Claims, 8 Drawing Figures

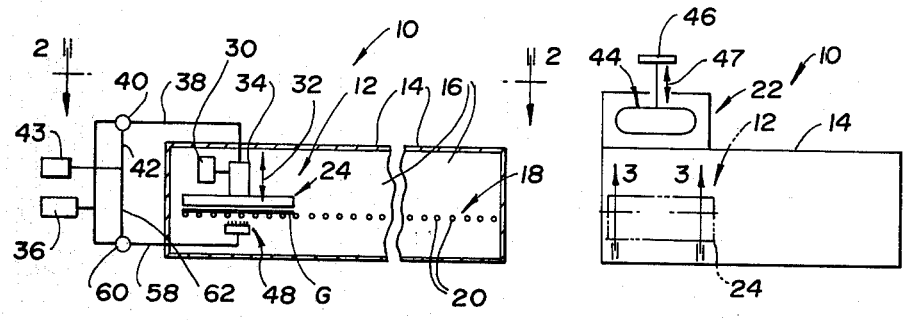
Fig. 1   Fig. 2
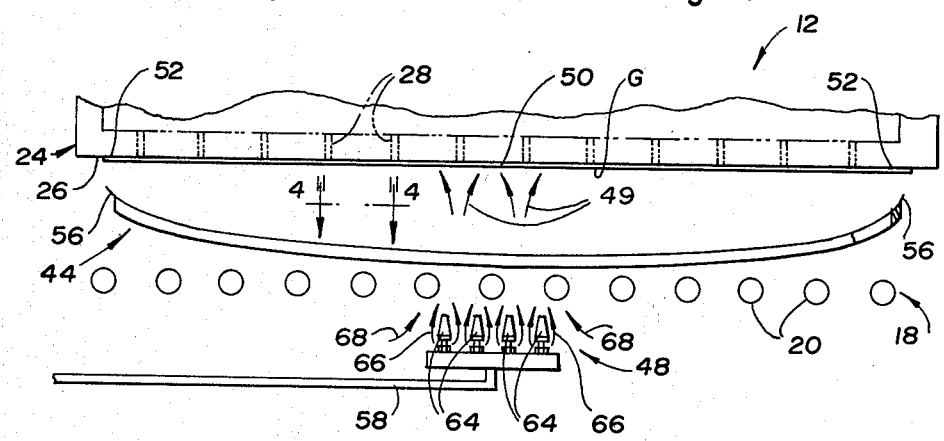
Fig. 3
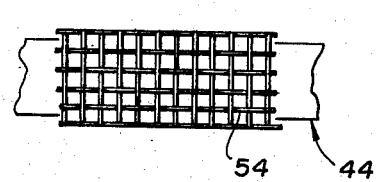   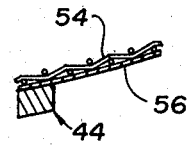
Fig. 4   Fig. 5

METHOD AND APPARATUS FOR DEEP BENDING GLASS SHEETS

TECHNICAL FIELD

This invention relates to a method and apparatus for deep bending glass sheets.

BACKGROUND ART

U.S. Pat. No. 4,282,026 discloses a system for bending heated glass sheets relatively quickly to a desired bent shape under the force of gravity. This system includes a holder having a downwardly facing surface that receives a heated glass sheet from a horizontal conveyor on which heating takes place. The holder then supports the heated glass sheet above the conveyor in preparation for bending. A curved bending mold of the system has at least a substantial portion with a greater curvature than the holder surface and receives the heated glass sheet therefrom for bending under the force of gravity. One preferred embodiment of the system utilizes a planar holder surface such that only the curved mold must be changed when different sizes and/or shapes of glass sheets are to be bent. Another preferred embodiment disclosed for making relatively deep bends includes a curved holder surface against which the planar heated glass sheet received from the conveyor is pre-bent prior to the gravity bending on the curved mold which has a greater curvature than that of the curved holder surface. With both embodiments, the curved mold is moved from the holder to a quench unit in a time that controls the extent of bending prior to rapid cooling that hardens and tempers the bent glass sheet.

Deep bending of glass sheets with the system discussed above can result in substantial sliding of the glass sheet on the curved mold when the decrease in the length between the ends of the glass sheet after the bending is about 1 inch (i.e. about 2.5 centimeters) or more. For example, a vehicle rear window having a chordal length of 54 and 5/16 inches with a maximum depth of bend of 4 and 1/4 inches from a chord between its ends requires an initial planar glass sheet having a length of 55 and 3/4 inches prior to bending. The difference between the flat length and the chordal length thus results in the substantial sliding if a deep bending is to be made on the mold directly from the planar holder surface. Also, relatively abrupt end bends can be difficult to perform when the greatest radius of curvature of the central portion of the bent glass sheet between its bent ends is more than about three times the radius of curvature of the end bends.

U.S. Pat. No. 4,229,199 discloses glass bending apparatus including a downwardly facing vacuum platen through which a vacuum is applied at a pair of spaced edge chambers and an intermediate center chamber. Such a construction is stated in this patent to allow the central portion of the glass sheet to be released either before or after its edges in order to control the manner in which bending takes place.

DISCLOSURE OF INVENTION

An object of the present invention is to provide an improved method and apparatus for deep bending glass sheets. Minimal sliding takes place between the glass sheet and the mold when deep bending is performed in accordance with the invention; the glass sheet is also accurately located on the mold to insure bending to the desired shape; and relatively abrupt end bends can be easily performed.

In carrying out the above object and other objects of the invention, the method for deep bending glass sheets is performed by initially supporting a heated glass sheet against a downwardly facing surface above a curved bending mold having an upwardly concave shape. An upward gas flow is supplied at a central portion of the supported glass sheet between its opposite extremities. The opposite extremities of the glass sheet are released to drop downwardly onto the mold while the upward gas flow continues to support the central portion of the glass sheet against the downwardly facing surface. Thereafter, the upward gas flow is terminated such that the central portion of the glass sheet drops downwardly and bends on the mold. Minimal sliding takes place between the glass sheet and the mold even when deep bending is performed from a flat length about one inch (i.e. about 2.5 centimeters) or more greater than the chordal length between the ends of the bent sheet. The upward gas flow holds the central portion of the glass sheet against movement with respect to the surface such that the extremities thereof drop onto the mold in an accurately controlled manner to insure bending of the glass sheet to the desired shape. Also, relatively abrupt end bends can also be made where the greatest radius of curvature of the central portion between the bent ends is more than about three times the radius of curvature of the end bends.

The heated glass sheet is preferably supported against the downwardly facing surface by drawing a vacuum through the surface and the opposite extremities of the supported glass sheet are released by terminating the vacuum drawn. A drawn vacuum assists the upward gas flow in supporting the central portion of the glass sheet after the opposite extremities thereof drop downwardly. Preferably, this vacuum assist is provided by again drawing the vacuum after the opposite extremities of the glass sheet have dropped downwardly. However, it is also possible for the vacuum to be drawn at center and end areas of the surface such that the vacuum at the end areas is terminated to release the opposite extremities of the glass sheet as the vacuum at the center area is maintained to assist the upward gas flow in supporting the central portion of the glass sheet. The surface against which the glass sheet is supported has a planar shape such that the glass sheet initially bends from a planar condition as its opposite extremities drop downwardly onto the mold with the central portion held in contact with the surface by the upward gas flow and the vacuum.

The glass sheet is disclosed as being initially heated within the heating chamber in which the downwardly facing surface is located. Heating of the glass sheet is performed within the heating chamber during conveyance on a roller conveyor. The downwardly facing planar surface is moved in a downward direction into proximity with a heated glass sheet on the conveyor to facilitate the initial support thereof as the vacuum is drawn through the surface. The planar surface is then moved upwardly to support the heated glass sheet in an upwardly spaced position above the conveyor whereupon the curved bending mold is moved into the heating chamber to a position below the supported glass sheet in preparation for the bending.

Pressurized gas is fed into the heating chamber to provide a primary upward gas flow that induces a secondary upward gas flow whereby the combined upward gas flow provides the support of the central portion of the heated glass sheet against the downwardly facing surface as the opposite extremities of the glass sheet are released for the initial bending on the curved mold. Termination of the primary upward gas flow thus also terminates the secondary upward gas flow to release the central portion of the heated glass sheet which then drops downwardly onto the mold for bending.

Quenching gas may also be impinged with the oppositely facing surfaces of the bent glass sheet on the mold to provide tempering of the glass. This tempering is disclosed as being performed by moving the mold from the heating chamber to a quench unit that supplies the quenching gas to perform the tempering.

Apparatus for deep bending glass sheets in accordance with the invention includes a holder having a downwardly facing surface for supporting and releasing a heated glass sheet. A bending mold of the apparatus has an upwardly facing concave shape for receiving the heated glass sheet from the holder surface. A gas supply unit supplies an upward gas flow against a central portion of the heated glass sheet supported against the holder surface to maintain the central portion supported as opposite extremities of the glass sheet drop downwardly onto the mold. A control of the gas supply unit terminates the upward gas flow from the gas supply unit to release the central portion of the glass sheet from the holder surface for bending on the mold. Minimal sliding takes place between the glass sheet and the mold when the deep bending is performed by this apparatus. Deep bending performed by this apparatus also insures accurate location of the glass sheet on the mold due to the manner in which the central portion of the glass sheet is held against the holder surface by the upward gas flow as its extremities drop downwardly onto the mold. Additionally, relatively abrupt end bends can be made where the greatest radius of curvature of the central portion between the bent ends is more than about three times the radius of curvature of the end bends.

The apparatus also includes a vacuum unit that draws a vacuum through the holder surface to provide the support of the glass sheet in preparation for bending. The vacuum unit terminates the vacuum drawn through the holder surface to release the opposite extremities of the glass sheet while the upward gas flow continues to support its central portion. A control of the vacuum unit again actuates drawing the vacuum after the end extremities of the glass sheet drop downwardly to thereby provide a means for assisting the upward gas flow in supporting the central portion of the glass sheet against the holder surface. As previously mentioned, it is also possible for the holder surface to have the holder surface divided into a center area and end areas such as by separate compartments through which the vacuum is drawn. A suitable control utilized with the vacuum unit then permits the vacuum at the center area to be maintained as the vacuum at the end areas is terminated. In either case, termination of the vacuum and upward gas flow releases the central portion of the glass sheet for bending on the mold along with its opposite extremities.

The apparatus disclosed includes a heating chamber in which the holder is located as is a horizontal conveyor which is preferably of the roller type for conveying glass sheets through the chamber for heating. The holder surface has a planar shape that is oriented parallel to the plane of glass sheet conveyance. An actuator of the apparatus moves the holder downwardly to position the surface thereof in proximity with a heated glass sheet on the conveyor below the holder whereupon the vacuum unit draws a vacuum at the surface such that the holder receives the heated glass sheet. The actuator then moves the holder upwardly with the glass sheet supported thereby to a position spaced above the conveyor.

The gas supply unit of the apparatus includes gas jet pumps within the heating chamber and an external source of pressurized gas that is fed to the jet pumps to produce a primary upward gas flow within the heating chamber. This primary upward gas flow induces a secondary upward gas flow of heated gas within the chamber such that the combined upward gas flow supports the central portion of the heated glass sheet as the extremities thereof drop downwardly upon termination of the vacuum drawn at the holder surface.

The apparatus also includes a quench unit to which the mold moves the bent glass sheet for rapid cooling that provides tempering of the glass. Movement of the mold into the heating chamber to receive the glass sheet for bending is thus followed by mold movement to the quench unit for the tempering.

The objects, features, and advantages of the present invention are readily apparent from the following detailed description of the best mode for practicing the invention when taken in connection with the accompanying drawings.

BRIEF DESCRIPTION OF DRAWINGS

FIG. 1 is an elevational schematic view of apparatus for deep bending glass sheets in accordance with the present invention;

FIG. 2 is a top plan view of the apparatus taken in the direction of line 2—2 of FIG. 1;

FIG. 3 is an elevation view taken in the direction of line 3—3 of FIG. 2 and showing a heated glass sheet supported on a downwardly facing surface of a holder of the apparatus in preparation for bending on a curved bending mold positioned below the holder;

FIG. 4 is taken along line 4—4 of FIG. 3 and illustrates a screen mesh that covers a ring shape of the bending mold at an intermediate portion thereof between its opposite end extremities;

FIG. 5 is a sectional view through the mold taken adjacent one of its end extremities;

BEST MODE FOR CARRYING OUT THE INVENTION

Figure 6:
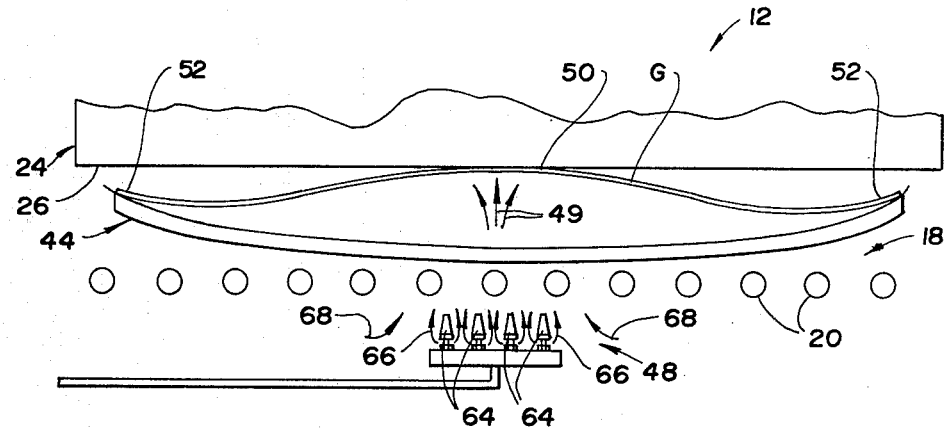
FIG. 6 is a view similar to FIG. 3 but illustrating the heated glass sheet with its opposite end extremities dropped downwardly onto the mold but with its central portion still supported against the holder surface.

Referring to FIGS. 1 and 2 of the drawings, a glass bending and tempering system generally indicated by 10 includes apparatus 12 for performing a method of deep bending glass sheets in accordance with the present invention. System 10 includes a housing 14 that defines a heating chamber 16 in which the apparatus is disclosed as being located. A horizontal conveyor 18 of the system is preferably of the roller type including rolls 20 on which glass sheets are conveyed for heating from room temperature to a heated condition. During the heating preceding the bending by the apparatus 12, the glass sheets remain planar and extend in a horizontal plane supported on the upper sides of the conveyor rolls 20. After bending by the apparatus 12 as is hereinafter more fully described, each bent glass sheet is moved from the bending apparatus 12 to a quench unit 22 for tempering that hardens the glass to improve its mechanical properties.

A method for deep bending glass sheets and the apparatus 12 for performing the method will now be described with initial reference to both FIGS. 1 and 3. Apparatus 12 includes a holder 24 having a downwardly facing surface 26 for supporting and releasing a heated glass sheet received from the conveyor 18. Holder surface 26 has a planar shape as disclosed including openings 28 through which a vacuum is drawn to support the heated glass sheet. An actuator 30 (FIG. 1) moves the holder 24 vertically as shown by arrows 32 to facilitate lifting of a heated glass sheet from the conveyor 18 by the holder. Downward movement of the holder 24 initially positions the planar holder surface 26 in proximity with a heated glass sheet below the holder whereupon drawing of the vacuum through the holder surface secures the glass sheet to the holder. Thereafter, upward movement of the holder 24 under the operation of the actuator 30 lifts the supported glass sheet upwardly into a spaced relationship with the holder.

A vacuum unit of the apparatus preferably includes a gas jet pump 34 (FIG. 1) of the type disclosed by U.S. Pat. No. 4,222,763 to draw the vacuum through the holder surface 26. An external source 36 of pressurized gas is connected by a conduit 38 to the gas jet pump 34 to provide a primary gas flow that induces a secondary gas flow for drawing the vacuum through the holder surface 26. A valve 40 along conduit 38 is operated by a connection 42 to a control panel 43 to provide a control for commencing and terminating the vacuum drawn.

As seen in FIGS. 2 and 3, apparatus 12 also includes a bending mold 44 having an upwardly concave shape for receiving the heated glass sheet from the holder surface 26 for relatively deep bending. Mold 44 is of the ring type having an open center as seen in FIG. 2 and includes an actuator 46 that moves the mold in opposite directions, as illustrated by arrows 47, between the holder 24 within the heating chamber and the quench unit 22. During downward movement of the holder 24 to receive a heated glass sheet from the conveyor 18, the mold 44 is positioned at the quench unit 22 as the tempering of the previously bent glass sheet is completed. Upward movement of the holder 24 then positions the glass sheet G as shown in FIG. 3 spaced above the rolls 20 of the conveyor 18. Completion of the tempering of the previously bent glass sheet and transfer thereof from the mold 44 at the quench unit is then followed by movement of the mold into the heating chamber to below the supported glass sheet G on the holder surface 26.

A gas supply unit 48 of the apparatus supplies an upward gas flow as indicated by arrows 49 against a central portion 50 of the heated glass sheet between its opposite ends or extremities 52. It will be noted that the ring shape of the mold 44 located below the supported glass sheet G conforms in outline to the periphery of the glass sheet and is covered by a wire mesh 54 as seen in FIG. 4 to prevent chilling of the heated glass sheet when it is received by the mold for bending. Also, each opposite end of the mold 44 includes a sheet metal extension 56 that is also covered by the wire mesh 54 to insure that the glass sheet end extremities 52 are supported upon initially being received by the mold prior to the glass sheet assuming the curved shape of the mold.

Gas supply unit 48 of the apparatus is fed pressurized gas from the external source 36 shown in FIG. 1 through a conduit 58 as is hereinafter more fully described along which a control valve 60 is disposed. A connection 62 of the valve 60 to the control panel 43 provides a control of the operation of the gas supply unit 48 in coordination with the control of the vacuum drawn at the holder 24 by the gas jet pump 34.

With the glass sheet G supported above the mold 44 as illustrated in FIG. 3, the vacuum drawn through the holder surface 26 is terminated while the gas supply unit 48 continues to supply the upward gas flow 49 at the central portion 50 of the supported glass sheet. End extremities 52 of the supported glass sheet are then released from the holder surface 26 and fall downwardly as illustrated in FIG. 6 onto the opposite ends of the mold 44 while the central portion of the glass sheet remains supported against the holder surface 26. After the end extremities 52 drop downwardly, the control of the gas jet pump 34 of the vacuum unit again draws a vacuum at the holder surface 26 to assist the upward gas flow in supporting the central portion 50 of the glass sheet against the holder surface. Such a vacuum assist reduces the upward gas flow rate necessary to support the glass sheet and the possibility of undesired deformation of the heated glass in its softened condition due to the gas flow. The positioning of the central glass sheet portion 50 against the holder surface 26 insures that the end extremities 52 and ultimately the entire glass sheet will be accurately located with respect to the mold 44 such that the bending is performed to the desired shape.

Figure 7:
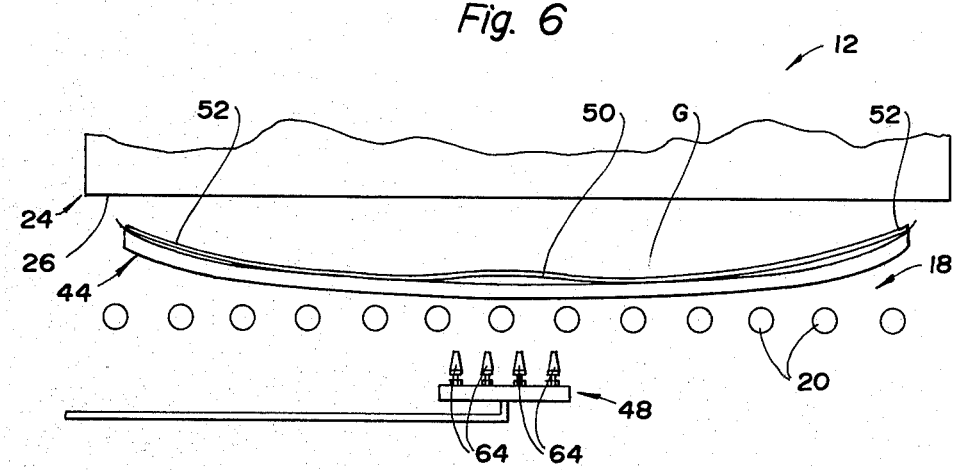
FIG. 7 is a view similar to FIG. 6 but showing the glass sheet after its central portion has dropped downwardly onto the mold during a later stage of the bending.
Figure 8:
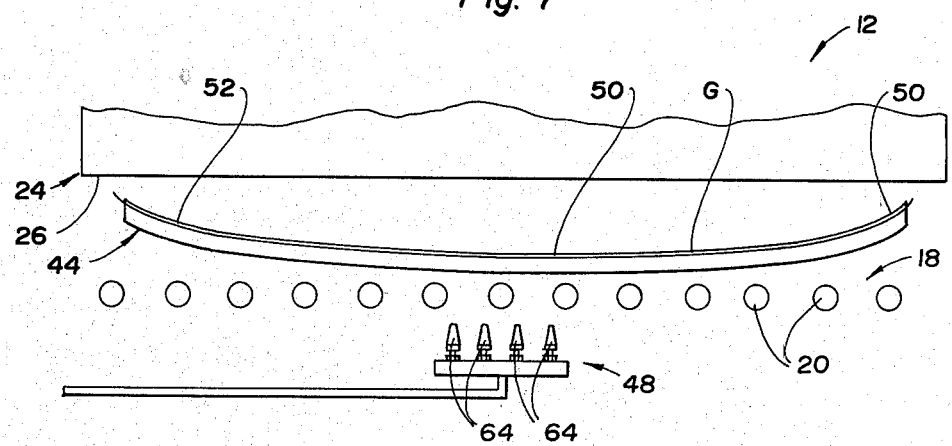
FIG. 8 is a view similar to FIG. 7 at a still later stage of the bending after the glass sheet has conformed to the shape of the mold.

After the glass sheet end extremities 52 drop downwardly to the position of FIG. 6, the vacuum drawn by jet pump 34 of the vacuum unit and the upward gas flow 49 from the gas supply unit 48 are terminated such that the central portion 50 of the heated glass sheet drops downwardly as shown in FIG. 7 onto the mold for bending. A substantial portion of the relatively abrupt bending of the end extremities 52 of the glass sheet takes place prior to the central portion 50 dropping downwardly. Such initial bending of the glass sheet extremities results in minimal sliding of the glass sheet with respect to the mold during the bending process. The difference between the planar length of the glass sheet and its chordal length between its opposite end extremities 52 in the bent shape is thus accommodated for by the initial end extremity bending in order to provide minimal sliding of the glass sheet with respect to the mold. The reduction in sliding achieved prevents marking of the bent glass sheet adjacent its edges and also reduces the possibility of the glass sheet shifting on the mold as the bending is performed. Complete bending of the glass sheet takes place as the central portion 50 and end extremities 52 sag from the position of FIG. 7 to the position of FIG. 8 in conformity to the curved shape of the mold. Such complete bending takes place even when the end extremities 52 have a relatively abrupt bend with respect to the cenntral portion 50 since the end extremities have a longer bending time on the mold than the central portion.

With reference to FIGS. 1 and 3, the gas supply unit 48 preferably includes gas jet pumps 64 to which the pressurized gas from the external source 36 is fed for flow through the conduit 58 into the heating chamber 16. Gas jet pumps 64 include restricted openings through which the pressurized gas is discharged to provide a primary upward gas flow as shown by arrows 66. This primary upward gas flow 66 includes a secondary upward gas flow of heated gas within the heating chamber as shown by arrows 68. The primary flow 66 has a mass flow rate on the order of about 5 percent to 15 percent of the secondary flow 68 such that the temperature of the combined upward flow 49 that impinges with the central portion 50 of the glass sheet G does not significantly reduce its temperature to adversely affect the bending and ultimate tempering that takes place.

Gas supply unit 48 can be operated at or near the completion of bending to prevent the central portion 50 of the glass sheet from sagging excessively at the open center of the ring mold 44. The central portion 50 of the glass sheet can also be bent upwardly a slight extent by operation of the gas supply unit at or near the end of bending to provide what is referred to in the glass industry as a "positive cross bend." Of course, a certain extent of bendinng may take place within the central portion of the mold 44 during the mold movement to the quench unit where hardening and tempering of the glass sheet is performed and such further bending must be taken into consideration in programming the mold movement to the quench unit after receiving the glass sheet from the holder surface.

While the best mode for carrying out the invention has herein been described in detail, those familiar with the art to which this invention relates will recognize various alternative designs and embodiments for practicing the invention as defined by the following claims.

What is claimed is:

1. A method for deep bending glass sheets comprising: supporting a heated glass sheet against a downwardly facing surfce above a curved bending mold having an upwardly concave shape; supplying an upward gas flow at a central portion of the supported glass sheet between opposite extremities thereof; releasing said opposite extremities of the glass sheet so as to drop downwardly onto the mold while the upward gas flow continues to support the central portion of the glass sheet against the downwardly facing surface; and thereafter terminating the upward gas flow such that the central portion of the glass sheet drops downwardly and bends on the mold.

2. The method of claim 1 wherein the heated glass sheet is supported against the downwardly facing surface by drawing a vacuum through said surface and wherein the opposite extremities of the suppoted glass sheet are released by terminating the drawn vacuum that supports the opposite extremities of the glass sheet.

3. The method of claim 2 wherein a drawn vacuum assists the upward gas flow in supporting the central portion of the glass sheet after the opposite extremities thereof drop downwardly.

4. The method of claim 1, 2, or 3 wherein the glass sheet is initially heated within a heating chamber in which the downwardly facing surface is located, and wherein pressurized gas fed into the heating chamber provides a primary upward gas flow that induces a secondary upward gas flow whereby the combined upward gas flow supports the central portion of the heated glass sheet against the downwardly facing surface as its opposite extremities are released.

5. The method of claim 4 wherein quenching gas is impinged with the oppositely facing surfaces of the bent glass sheet on the mold to provide tempering of the glass.

6. A method for deep bending glass sheets comprising: heating a glass sheet within a heating chamber during conveyance on a roller conveyor; drawing a vacuum through a downwardly facing surface located within the heating chamber above the conveyor such that the surface receives the heated glass sheet from the conveyor and supports the glass sheet above the conveyor; moving a curved bending mold having an upwardly concave shape to a position below the supported glass sheet; supplying an upward gas flow at a central portion of the supported glass sheet between opposite extremities thereof; terminating the vacuum drawn to release said opposite extremities of the glass sheet so as to drop downwardly onto the mold while the upward gas flow continues to support the central portion of the glass sheet against the downwardly facing surface; again drawing the vacuum to assist the upward gas flow in supporting the central portion of the glass sheet against the holder surface after the opposite extremities of the glass sheet drop downwardly; and thereafter terminating the vacuum and the upward gas flow such that the central portion of the glass sheet drops downwardly and bends on the mold.

7. A method for deep bending and tempering glass sheets comprising: heating a glass sheet within a heating chamber during conveyance on a roller conveyor; moving a downwardly facing planar surface located within the heating chamber above the conveyor in a downward direction into proximity with the heated glass sheet on the conveyor; drawing a vacuum through the planar surface such that the surface receives the glass sheet from the conveyor; moving the planar surface upwardly to support the heated glass sheet in an upwardly spaced position above the conveyor; moving a curved bending mold having an upwardly concave shape into the heating chamber to a position below the heated glass sheet supported against the planar surface; supplying a primary upward gas flow within the heating chamber to induce a secondary upward gas flow of heated gas within the chamber with the combind upward gas flow directed at a central portion of the supported glass sheet between opposite extremities thereof; terminating the vacuum to release said opposite extremities of the glass sheet so as to drop downwardly onto the mold while the upward gas flow continues to support the central portion of the glass sheet against the downwardly facing surface; again drawing the vacuum to assist the upward gas flow in supporting the central portiion of the glass sheet against the holder surface after the opposite extremities of the glass sheet drop downwardly; thereafter terminating the vacuum and the upward gas flow such that the central portion of the glass sheet drops downwardly and bends on the mold; and moving the mold from the heating chamber to a quench unit that tempers the bent glass sheet.

8. Apparatus for deep bending glass sheets comprising: a holding having a downwardly facing surface for supporting and releasing a heated glass sheet; a bending mold having an upwardly facing concave shape for receiving a heated glass sheet from the holder surface; a gas supply unit for supplying an upward gas flow against a central portion of the heated glass sheet supported against the holder surface to maintain said central portion supported as opposite extremities of the glass sheet drop downwardly onto the mold; and a control for terminating the upward gas flow from the gas supply unit to release the central portion of the glass sheet from the holder surface for bending on the mold.

9. Apparatus as in claim 8 further including a vacuum unit for drawing a vacuum through the holder surface to provide the support of the glass sheet.

10. Apparatus as in claim 9 wherein the vacuum unit includes means for drawing the vacuum to assist the upward gas flow in supporting the central portion of the glass sheet against the holder surface after the opposite extremities thereof drop downwardly.

11. Apparatus as in claim 8, 9, or 10 including a heating chamber in which the holder is located, and the gas supply unit including gas jet pumps within the heating chamber and an external source of pressurized gas that is fed to the jet pumps to produce a primary upward gas flow which induces a secondary upward gas flow of heated gas within the chamber such that the combined upward gas flow supports the central portion of the heated glass sheet as the extremities thereof drop downwardly.

12. Apparatus as in claim 9 further including a quench unit to which the mold moves the bent glass sheet for rapid cooling that provides tempering of the glass.

13. Apparatus for deep bending glass sheets comprising: a heating chamber; a horizontal conveyor for conveying glass sheets through the chamber for heating; a holder positioned above the conveyor and having a downwardly facing planar surface; a vacuum unit for drawing a vacuum at the holder surface to support a heated glass sheet received from the conveyor; the vacuum unit including a control for terminating the vacuum drawn to release the glass sheet; a bending mold having an upwardly facing concave shape for receiving a heated glass sheet from the holder surface; a gas supply unit for supplying an upward gas flow against a central portion of the heated glass sheet supported against the holder surface to maintain said central portion supported when the vacuum is terminated and opposite extremities of the glass sheet drop downwardly onto the mold; the vacuum unit being again operated by the control thereof to draw a vacuum that assists the upward gas flow in supporting the central portion of the glass sheet against the holder surface after the opposite extremities of the glass sheet drop downwardly; and a control for terminating the upward gas flow from the gas supply unit as the vacuum unit control again terminates the vacuum drawn to release the central portion of the glass sheet from the surfce for bending on the mold.

14. Apparatus for deep bending and tempering glass sheets comprising: a heating chamber; a horizontal roller conveyor for conveying glass sheets through the chamber for heating; a holder positioned within the heating chamber above the conveyor and having a downwardly facing planar surface; an actuator for moving the holder downwardly to position the surface thereof in proximity with a heated glass sheet on the conveyor below the holder; a vacuum unit for drawing a vacuum at the holder surface to receive the heated glass sheet below the holder from the conveyor; the actuator moving the holder upwardly with the glass sheet supported thereby to a position spaced above the conveyor; a bending mold movable into the heating chamber to below the supported glass sheet on the raised holder and having an upwardly facing concave shape for receiving the glass sheet from the holder surface; the vacuum unit including a control for terminating the vacuum drawn to release the glass sheet; a gas supply unit including gas jet pumps within the heating chamber and an external source of pressurized gas that is fed to the gas jet pumps to produce a primary upward gas flow which induces a secondary upward gas flow of heated gas within the heating chamber such that the combined upward gas flow maintains a cental portion of the heated glass sheet supported against the holder surface when the vacuum is terminated and opposite extremities of the glass sheet drop downwardly onto the mold; the vacuum unit being again operated by the control thereof to draw a vacuum that assists the upward gas flow in supporting the central portion of the glass sheet against the holder surface after the opposite extremities of the glass sheet drop downwardly; a control for terminating the upward gas flow from the gas supply unit as the vacuum unit control again terminates the vacuum drawn to release the central portion of the glass sheet from the surface for bending on the mold; and a quench unit to which the mold moves the bent glass sheet for tempering.

* * * * *